United States Patent
Yasugi et al.

(10) Patent No.: US 8,368,238 B2
(45) Date of Patent: Feb. 5, 2013

(54) WIND TURBINE GENERATOR SYSTEM

(75) Inventors: Akira Yasugi, Nagasaki (JP); Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 46 days.

(21) Appl. No.: 12/448,307

(22) PCT Filed: Aug. 14, 2008

(86) PCT No.: PCT/JP2008/064583
§ 371 (c)(1),
(2), (4) Date: Dec. 4, 2009

(87) PCT Pub. No.: WO2010/018631
PCT Pub. Date: Feb. 18, 2010

(65) Prior Publication Data
US 2011/0156388 A1 Jun. 30, 2011

(51) Int. Cl.
*H02P 9/04* (2006.01)
(52) U.S. Cl. ............................................. 290/44; 322/20
(58) Field of Classification Search .................. 700/287, 700/298; 290/44; 322/20, 24
See application file for complete search history.

(56) References Cited

U.S. PATENT DOCUMENTS

| 5,083,039 | A | 1/1992 | Richardson et al. |
| 6,924,565 | B2 | 8/2005 | Wilkins et al. |
| 7,417,333 | B2 * | 8/2008 | Miller et al. ..................... 290/44 |
| 7,659,637 | B2 | 2/2010 | Ichinose et al. |
| 7,966,103 | B2 * | 6/2011 | Jorgensen et al. ............ 700/297 |
| 8,120,932 | B2 * | 2/2012 | Folts et al. ....................... 363/37 |
| 2007/0273155 | A1 | 11/2007 | Barton et al. |
| 2008/0157533 | A1 | 7/2008 | Flottemesch et al. |

FOREIGN PATENT DOCUMENTS

| JP | H06-284798 A | 10/1994 |
| JP | H07-036720 B | 4/1995 |
| JP | 2007-267586 A | 10/2007 |

OTHER PUBLICATIONS

Chinese Patent Office, Notification of the Grant of Patent Right for Invention, Aug. 28, 2012.

* cited by examiner

*Primary Examiner* — Michael Zarroli
(74) *Attorney, Agent, or Firm* — Manabu Kanesaka; Kenneth M. Berner; Benjamin J. Hauptman

(57) ABSTRACT

It is an object to provide a wind turbine generator system that can promptly restore the system voltage in the event of, for example, a low voltage phenomenon. A controller 21 detects the power factor state of a generator when a normal operation mode is switched to a low-voltage control mode and sets a condition for switching from the low-voltage control mode to the normal operation mode depending on the detected power factor state.

3 Claims, 3 Drawing Sheets

WIND TURBINE GENERATOR SYSTEM

TECHNICAL FIELD

The present invention relates to a wind turbine generator system.

BACKGROUND ART

In operation control of a wind turbine, when the system voltage is decreased, for example, in the event of a power outage, it is operated such that the connection between the wind turbine and the power system is promptly disconnected to prevent a generator and other components from being damaged by overcurrent. On the other hand, for example, in a case of occurrence of a low voltage phenomenon, such as a voltage decrease pattern that is required in LVRT (low voltage ride-through), there is a trend towards standardization such that the wind turbine is continuously operated by maintaining the connection between the wind turbine and the power system.

This is for using electrical power generated by the wind turbine and reactive power for voltage restoration and recovering from frequency fluctuations after recovering from an accident by not disconnecting the wind turbine from the system, even if the system voltage instantaneously drops due to, for example, accidental short circuiting of the power system, if it is within a certain period of time.

In order to accelerate the restoration of the system voltage after the accident, it is important to supply reactive power to the power system. For example, Patent Document 1 discloses a wind turbine generator system that supplies reactive power to the power system during an electrical power drop.

Patent Document 1: U.S. Patent Application, Publication No. 2007/0273155

DISCLOSURE OF INVENTION

In order to promptly restore the system voltage after an electrical power drop, it is important to design control logic for properly controlling reactive power, namely, reactive current.

The present invention has been accomplished for solving the above-mentioned problems, and it is an object thereof to provide a wind turbine generator system that can promptly restore the system voltage in the event of, for example, instantaneous power outage or a low voltage phenomenon (e.g., a phenomenon defaulted by LVRT) where a low-voltage state continues for a predetermined period of time.

The present invention employs the following solutions for solving the above-mentioned problems.

The present invention provides a wind turbine generator system including a generator connected to a power system and a control unit having a normal operation mode and a low-voltage control mode that controls reactive current depending on the terminal voltage of the generator and switching from the normal operation mode to the low-voltage control mode when the system voltage of the power system is decreased to a value lower than a predetermined value for switching the mode and switching from the low-voltage control mode to the normal operation mode when the system voltage of the power system is increased to a value higher than a standard terminal voltage, wherein the control unit detects the power factor state of the generator when the normal operation mode is switched to the low-voltage control mode and sets the standard terminal voltage for switching from the low-voltage control mode to the normal operation mode depending on the detected power factor state.

For example, when the power factor is inductive, control is performed such that reactive power is absorbed from the power system, and when the power factor is capacitive, control is performed such that reactive power is supplied to the power system. Here, for example, when the normal state of the system is changed due to the occurrence of an instantaneous power outage, a low voltage phenomenon, or the like, the mode is switched from the normal operation mode to the low-voltage control mode. The condition for switching from the low-voltage control mode to the normal operation mode is preferably determined in view of the control after switching to the normal operation mode. In the present invention, since the standard terminal voltage is set depending on the power factor state, it is possible to switch from the low-voltage control mode to the normal operation mode at a suitable timing.

In the above-mentioned wind turbine generator system, in the case where the power factor of the generator is inductive when the normal operation mode is switched to the low-voltage control mode, the control unit may set the standard terminal voltage to a previously registered first value, and in the case where the power factor of the generator is capacitive, the control unit may set the standard terminal voltage to a second value that is lower than the first value.

When the power factor is capacitive, since control is performed such that reactive power is supplied to the power system even in the normal operation mode, the supply of reactive power to the power system is continued after the low-voltage control mode is switched to the normal operation mode. On the other hand, when the power factor is inductive, in the normal operation mode, control is performed such that reactive power is absorbed by the power system. Therefore, the instability of the power system is accelerated if the mode is switched earlier than the restoration of power in the power system.

In view of these phenomena, the period of time during which the low-voltage control mode is employed is shortened by setting the standard terminal voltage of the generator in the case of a capacitive power factor to a value lower than that in the case of an inductive power factor, and thereby it is possible to return the mode to the normal operation mode at an early stage.

In addition, in the case of an inductive power factor, it is possible to certainly restore the power system from a low-voltage phenomenon by setting the standard terminal voltage to a value that enables accurate confirmation of the restoration of power in the power system.

In the above-mentioned wind turbine generator system, the first value and the second value may be determined based on the result of simulation performed in advance.

Thus, since the first and the second values are determined by simulation performed in advance, it is possible to switch the mode at a suitable timing.

The present invention affords an advantage in that the system voltage is promptly restored in the event of, for example, an instantaneous power outage or a low voltage phenomenon where a low-voltage state continues for a predetermined period of time.

Explanation of Reference Signs:

| | |
|---|---|
| 1: | wind turbine generator system |
| 2: | tower |
| 3: | nacelle |
| 4: | nacelle-slew mechanism |
| 5: | generator |
| 6: | gear |
| 7: | wind turbine rotor |
| 8: | blade |
| 9: | hub |
| 13: | power system |
| 14: | active rectifier |
| 15: | DC bus |
| 16: | inverter |
| 17: | AC-DC-AC converter |
| 20: | voltage/current sensor |
| 21: | controller |

BEST MODE FOR CARRYING OUT THE INVENTION

An Embodiment of a wind turbine generator system according to the present invention will now be described with reference to the drawings.

Figure 1:
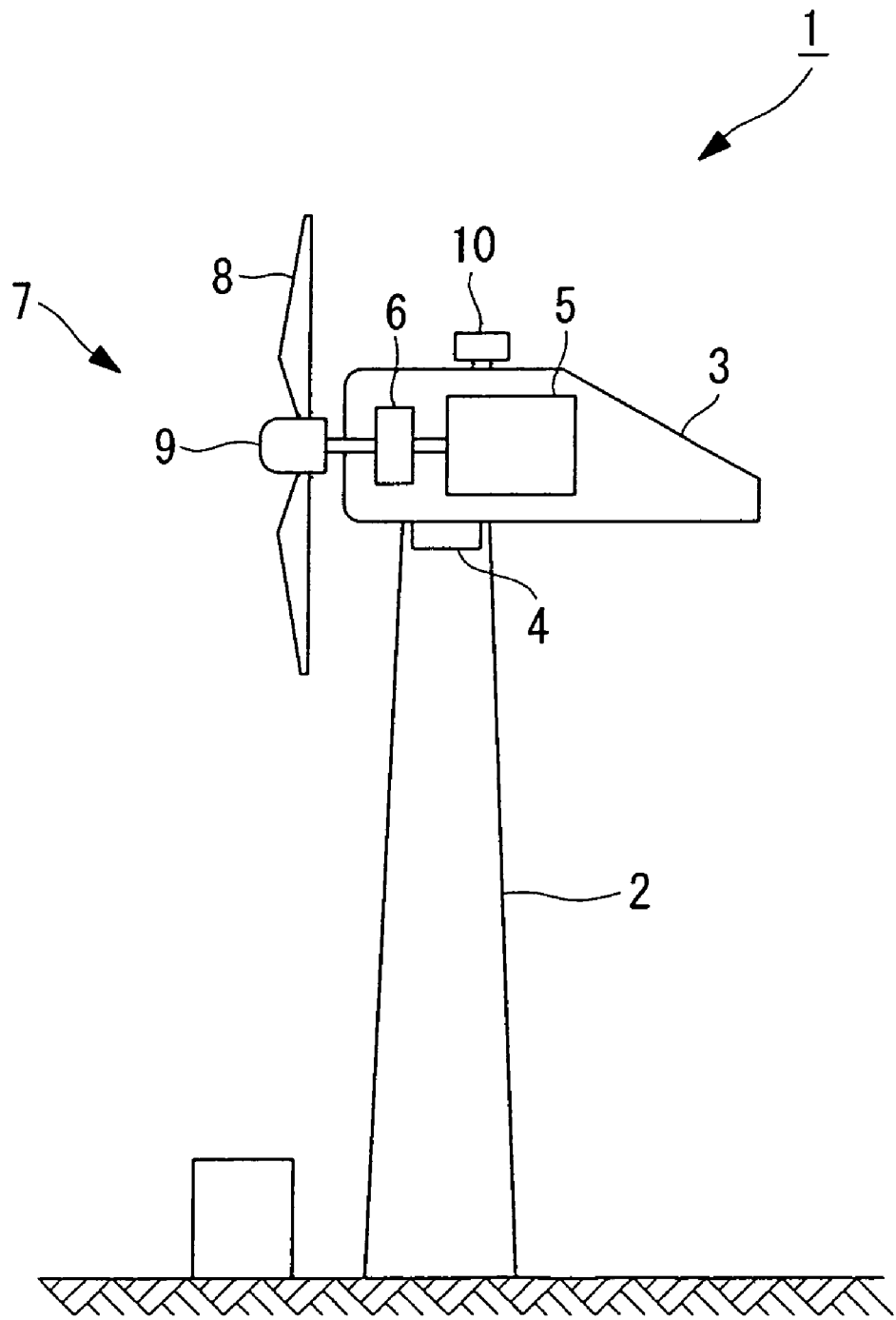
FIG. 1 is a block diagram showing the entire structure of a wind turbine generator system according to an Embodiment of the present invention.

FIG. 1 is a block diagram showing the entire structure of a wind turbine generator system according to this Embodiment. As shown in FIG. 1, a wind turbine generator system 1 includes a tower 2 and a nacelle 3 disposed atop the tower 2. The nacelle 3 can slew in the yaw direction and is slewed in a desired direction by a nacelle-slew mechanism 4. The nacelle 3 is provided with a generator 5 and a gear 6. The rotor of the generator 5 is connected to a wind turbine rotor 7 via the gear 6.

The wind turbine rotor 7 includes blades 8 and a hub 9 supporting the blades 8. The blades 8 are provided such that the pitch angle thereof can be changed.

The nacelle 3 further includes a wind speed/direction meter 10. The wind speed/direction meter 10 measures wind speed and wind direction. The nacelle 3 is slewed corresponding to the wind speed and wind direction measured with the wind speed/direction meter 10.

Figure 2:
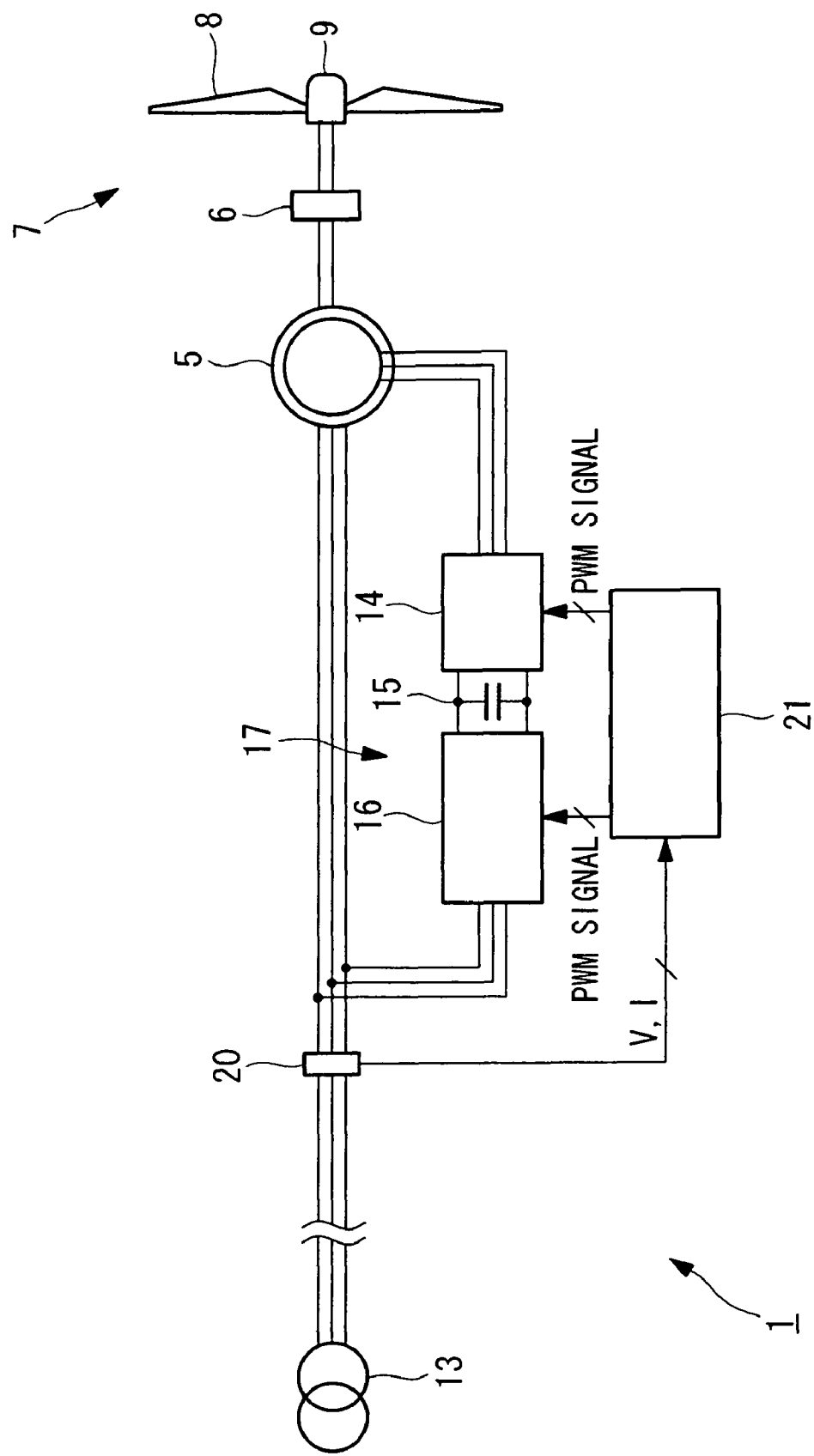
FIG. 2 is a block diagram showing an exemplary structure of a generator and the periphery thereof.

FIG. 2 is a block diagram showing an exemplary structure of the generator 5 and the periphery thereof. The generator 5 of this Embodiment is configured such that electrical power generated by the generator 5 can be outputted to a power system 13 from both a stator winding and a rotor winding. Specifically, in the generator 5, the stator winding is connected directly to the power system 13, and the rotor winding is connected to the power system 13 via an AC-DC-AC converter 17.

The AC-DC-AC converter 17 is composed of an active rectifier 14, a DC bus 15, and an inverter 16 and converts AC power received from the rotor winding to AC power that is compatible with the frequency of the power system 13.

Specifically, the active rectifier 14 converts AC power generated in the rotor winding to DC power and outputs the DC power to the DC bus 15. The inverter 16 converts the DC power received from the DC bus 15 to AC power having the same frequency as that of the power system 13 and outputs the AC power.

The AC-DC-AC converter 17 also has a function to convert AC power received from the power system 13 to AC power that is compatible with the frequency of the rotor winding and therefore is also used for energizing the rotor winding according to the operating conditions of the wind turbine generator system 1. In this case, the inverter 16 converts AC power to DC power and outputs the DC power to the DC bus 15. The active rectifier 14 converts the DC power received from the DC bus 15 to AC power that is compatible with the frequency of the rotor winding and supplies the AC power to the rotor winding of the generator 5.

A voltage/current sensor 20 is provided on a power line connecting the generator 5 to the power system 13 and measures the output voltage (hereinafter, referred to as "generator terminal voltage") and the output current of the generator 5.

A controller 21 controls ON/OFF states of the active rectifier 14 and the power transistor of the inverter 16 for controlling active power P and reactive power Q that are supplied to the power system 13.

Specifically, the controller 21 has a normal operation mode and a low-voltage control mode for controlling reactive current according to the terminal voltage of the generator 5. When the system voltage of the power system 13 is decreased to a value lower than a predetermined mode-switching value set in advance, the normal operation mode is switched to the low-voltage control mode. When the system voltage of the power system 13 is increased to a value higher than a standard terminal voltage, the low-voltage control mode is switched to the normal operation mode.

Here, since the system voltage of the power system 13 and the generator terminal voltage are approximately the same, the system voltage of the power system 13 and the generator terminal voltage can be regarded as being similar to each other. That is, in the case of the above description, the mode is switched according to the system voltage of the power system 13, which is equivalent to the mode being switched based on the generator terminal voltage.

In the above-mentioned normal operation mode, for example, constant-power-factor control is performed. In the constant-power-factor control, the controller 21 calculates the active power P and the reactive power Q from the generator terminal voltage and the output current measured with the voltage/current sensor 20 and performs PWM control of the active rectifier 14 and the inverter 16 such that these active power P and the reactive power Q agree with an active power command value P* and a reactive power command value Q*, respectively, for keeping the power factor constant. The active power command value P* and the reactive power command value Q* are, for example, command values given wirelessly or via wires from a power monitor (not shown) for monitoring power control in the power system (grid) 13. In addition, during the normal operation mode, the operation control is not limited to the above-mentioned method, and it is possible to employ a known control logic such as constant output control.

Furthermore, during the above-mentioned normal operation mode, when a low-voltage phenomenon prescribed by, for example, LVRT occurs or when an instantaneous power outage occurs, the controller 21 switches the normal operation mode to the low-voltage control mode.

For example, when the power factor of the generator 5 is inductive, in other words, when the reactive current is absorbed from the power system 13, the mode is switched when the generator terminal voltage exceeds a mode switching value Vhigh (for example, 1.1 pu). When the power factor of the generator 5 is capacitive, in other words, when the reactive current is supplied to the power system 13, the mode is switched when the generator terminal voltage falls below a mode switching value Vlow (for example, 0.9 pu).

As the low-voltage control mode, two control logics, a reactive current absorbing logic and a reactive current supplying logic, are prepared. When the power factor of the generator 5 is inductive, the reactive current absorbing logic is employed, and when the power factor is capacitive, the reactive current supplying logic is employed.

Figure 3:
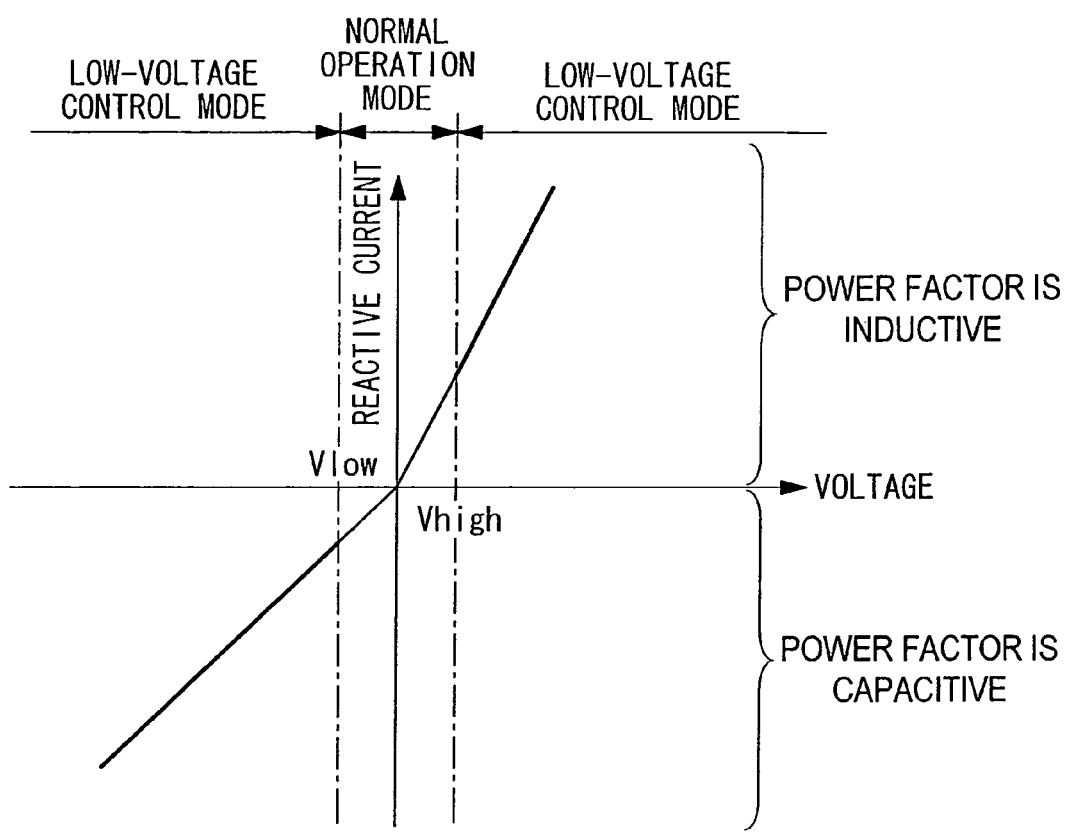
FIG. 3 is a diagram showing an example of a current-voltage table stored in a controller.

For example, the controller 21 has a current-voltage table shown in FIG. 3 and controls reactive current using this table. In FIG. 3, the horizontal axis indicates generator terminal voltage, and the vertical axis indicates reactive current. Thus, in the low-voltage control mode, the output current is controlled depending on the generator terminal output. In addition, here, the controller 21 having a table is described, but instead of the table, the controller 21 may have an arithmetic expression using the reactive current and generator terminal voltage as parameters.

Furthermore, the controller 21 has a switching condition for switching from the low-voltage control mode to the normal operation mode depending on the power factor status of the generator 5. The condition for switching from the low-voltage control mode to the normal operation mode is a combination of the standard terminal voltage of the generator 5 and the standard continuous duration.

Specifically, in the case where the power factor of the generator 5 is inductive when the normal operation mode is switched to the low-voltage control mode, the controller 21 sets the standard terminal voltage of the generator 5 to a first value that is registered in advance. In the case where the power factor of the generator 5 is capacitive, the controller 21 sets the standard terminal voltage of the generator 5 to a second value that is smaller than the first value registered in advance.

More specifically, the controller 21 has a switching condition that "if a state in which the system voltage is equal to or higher than the standard terminal voltage continued for three seconds, switch from the low-voltage control mode to the normal operation mode". In an inductive case, the standard terminal voltage is set to the first value, and in a capacitive case, the standard terminal voltage is set to the second value.

In this Embodiment, 1.0 pu is registered as the first value, and 0.85 pu is registered as the second value. In addition, a method for determining these first and second values is described below in detail.

Next, the operation of the above-mentioned wind turbine generator system 1 will be described.

In normal control, the controller 21 employs the normal operation mode, and the output of the generator 5 is controlled so as to have a constant power factor. While such a normal operation mode is being employed, if a low voltage phenomenon occurs and the generator terminal voltage becomes a value that is not lower than the mode switching value Vhigh (inductive case) or not higher than the mode switching value Vlow (capacitive case), the controller 21 switches from the normal operation mode to the low-voltage control mode.

Furthermore, the controller 21 judges whether the power factor of the generator 5 is inductive or capacitive. In the inductive case, the condition "if a state in which the system voltage is 1.0 pu or more continued for three seconds, switch the mode" is set as the switching condition for switching from the low-voltage control mode to the normal operation mode. On the other hand, in the capacitive case, the condition "if a state in which the system voltage is 0.85 pu or more continued for three seconds, switch the mode" is set.

In the low-voltage control mode, the generator terminal voltage detected by the voltage/current sensor 20 is inputted to the controller 21. The controller 21 obtains a reactive current corresponding to the generator terminal voltage from the current-voltage table shown in FIG. 3, generates a PWM control signal indicating the obtained reactive current, and outputs this command to the inverter 16 and the active rectifier 14. By doing so, the reactive current based on FIG. 3 is supplied to the power system 13. The result is that reactive power that is relatively larger than that in the normal operation mode is supplied to the power system 13.

In addition, as shown in FIG. 3, the slope in the inductive case is larger than that in the capacitive case. This shows that the absolute value of the change in reactive current caused by a change in generator terminal voltage in the inductive case is larger that that in the capacitive case. Accordingly, the control response of the generator to an increase in the power system voltage can be made quicker than that to a decrease.

By thus supplying the reactive power to the power system 13, the voltage of the power system 13 gradually recovers, and satisfying the switching condition for mode switching, which the controller 21 sets, allows the controller 21 to switch from the low-voltage control mode to the normal operation mode. Then, constant-power-factor control is performed again.

Next, a method for determining the above-mentioned standard terminal voltage will be described.

Regarding the standard terminal voltage, simulation is performed in advance for determining an optimum standard terminal voltage for each of the inductive and capacitive cases.

For example, as shown in FIG. 3, in the reactive current absorption control logic in the low-voltage control mode, control is performed such that the absolute value of reactive current Iqndh increases with an increase in output voltage Vndh, and in the reactive current supply control logic, control is performed such that the absolute value of reactive current Iqndh increases with a decrease in output voltage Vndh.

The relationship between the generator terminal voltage and the reactive current, when the power factor shown in FIG. 3 is inductive or capacitive, is represented by the following expressions (1) and (2):

$$Iqndh = 2 \times (1 - Vndh) \text{ (in the case of } Vndh < 1.0 \text{ pu: capacitive)} \quad (1)$$

$$Iqndh = 10 Vndh - 10 \text{ (in the case of } Vndh > 1.0 \text{ pu: inductive)} \quad (2)$$

In expressions (1) and (2) above, Iqndh denotes the reactive current, and Vndh denotes the generator terminal voltage.

On the other hand, in the normal operation mode, since constant-power-factor control is performed, the reactive current in this mode is determined by the power factor as shown by the following expression (3):

$$Iqn = In \times \sin \theta n \quad (3)$$

In expression (3) above, Iqn denotes the reactive current, and θn denotes the power factor angle.

Now, for example, in the case where the power factor of the generator 5 is capacitive when the low-voltage control mode is switched to the normal operation mode, provided that the output is constant, the generator terminal voltage in the normal operation mode is represented by a linear function of the reactive current for the following reasons.

For example, when the voltage (voltage of voltage system (grid)) at the receiving end, the active power, the reactive power, and the reactance presenting between the receiving end and the transmitting end are denoted by Pr, Qr, Vr, and X, respectively, and the voltage (generator terminal voltage) at the transmitting end is denoted by Vs, the following expression (4) is given. Here, the impedance between the transmitting and receiving ends (between the generator output terminal and the voltage system) is denoted by Z.

$$Pr^2+(Q+Vr^2/X)^2=(Vs\times Vr/X)^2 \quad (4)$$

In expression (4) above, if the output √3×Vr×In, the voltage at the transmitting end and the impedance are assumed to be constant, expression (4) above can be modified to the following expression (5):

$$Vr=\gamma In\cdot\sin\theta \quad (5)$$

This means that, when the system voltage and the output are constant, the generator terminal voltage can be represented by a linear function of the reactive current.

From the above, the generator terminal voltage when the low-voltage control mode is switched to the normal operation mode and the reactive current satisfy the following expression (6):

$$Iqn-Iqndh=\alpha Vn-\beta Vndh \quad (6)$$

In expression (6) above, Iqn denotes the reactive current in the normal operation mode, Iqndh denotes the reactive current in the low-voltage control mode, Vn denotes the generator terminal voltage in the normal operation mode, Vndh denotes the generator terminal voltage in the low-voltage control mode, and α and β are each a given proportional constant.

Expressing each of the above by per unit (pu) and substituting the above-mentioned expression (1) leads to the following expression (7):

$$Vndh=\tfrac{1}{3}(3-Iqn) \quad (7)$$

When power factors (0.95 or more and 1.0 or less) in the capacitive case are assumed from expression (7) above, the generator terminal voltages when the low-voltage control mode is switched to the normal operation mode are determined. The results are shown in Table 1.

TABLE 1

| cos θn | Vndh | Result |
|---|---|---|
| 0.95 | 0.89 | Low-voltage control mode is not deactivated |
| 0.96 | 0.90 | Low-voltage control mode is not deactivated |
| 0.97 | 0.92 | Low-voltage control mode is deactivated |
| 0.98 | 0.93 | Low-voltage control mode is deactivated |
| 0.99 | 0.95 | Low-voltage control mode is deactivated |
| 1.0 | 1.0 | Low-voltage control mode is deactivated |

The following is concluded from Table 1 above:

1) In the case where the power factor in the normal operation mode is smaller than 0.97, switching to the normal operation mode can be achieved in the shortest period of time when the standard value of the generator terminal voltage for switching from the low-voltage control mode to the normal operation mode is set to 0.85. On the other hand, when the standard value of the generator terminal voltage for switching from the low-voltage control mode to the normal operation mode is 0.9, this standard value is not satisfied. Therefore, the low-voltage control mode is not switched to the normal operation mode.

2) In the case where the power factor in the normal operation mode is larger than 0.98, if the standard value of the generator terminal voltage for switching from the low-voltage control mode to the normal operation mode is set to 0.85, a state where the system voltage is not restored is falsely recognized as having restored, resulting in switching to the normal operation mode in the shortest period of time. However, also in this state, the reactive current is continuously supplied to the power system 13 in the normal operation mode and thereby can continuously contribute to stabilization of the system voltage. On the other hand, when the standard value of the generator terminal voltage for switching from the low-voltage control mode to the normal operation mode is 0.9, switching to the normal operation mode can be achieved in a relatively short period of time.

From the above, for example, in the case where the power factor is capacitive when switching from the normal operation mode to the low-voltage control mode, the voltage condition of the system can be stabilized in a relatively short period of time by setting the standard value of the generator terminal voltage when the low-voltage control mode is switched to the normal operation mode to, for example, 0.85.

On the other hand, in the case where the power factor is inductive when the normal operation mode is switched to the low-voltage control mode, the following expression (8) is given as an expression corresponding to the above-mentioned expression (7). Here, the following expression (8) is obtained by substituting expression (2) above into expression (6) above.

$$Vndh=(Iqn+9)/9 \quad (8)$$

When power factors (0.95 or more and 1.0 or less) in the inductive case are assumed from expression (8) above, the generator terminal voltages when the low-voltage control mode is switched to the normal operation mode are determined. The results are shown in Table 2.

TABLE 2

| cos θn | Vndh | Result |
|---|---|---|
| 0.95 | 1.034 | Low-voltage control mode is deactivated |
| 0.96 | 1.031 | Low-voltage control mode is deactivated |
| 0.97 | 1.027 | Low-voltage control mode is deactivated |
| 0.98 | 1.022 | Low-voltage control mode is deactivated |
| 0.99 | 1.015 | Low-voltage control mode is deactivated |
| 1.0 | 1.0 | Low-voltage control mode is deactivated |

The following is concluded from Table 2 above:

1) In the case where the power factor in the normal operation mode is smaller than 1.0, the state where the system voltage is not restored is falsely recognized as having restored, resulting in switching to the normal operation mode in the shortest period. However, the reactive current is absorbed from the system in the normal operation mode, which further accelerates instability of the system voltage.

2) In the case where the power factor in the normal operation mode is 1.0, the state in which the system voltage is almost restored is detected, resulting in switching to the normal operation mode in the shortest period of time.

From the above, for example, in the case where the power factor is inductive when switching from the normal operation mode to the low-voltage control mode, false determination that the system voltage not yet restored is recognized as being restored and consequent mode switching can be avoided, and the system voltage conditions can be stabilized in a relatively short period of time, provided that the standard value of the generator terminal voltage when the low-voltage control mode is switched to the normal operation mode is set to 1.0.

Furthermore, in calculation, it is thought that the generator terminal voltage Vndh exceeds 1.0 pu when the system voltage is restored. Therefore, it is regarded that the system voltage is unstable if the Vndh value is smaller than 1.0 pu.

Thus, regarding the standard terminal voltage of the generator 5 held in the controller 21 shown in FIG. 2, simulation is performed as described above in advance for considering what standard terminal voltage should be set for switching from the low-voltage control mode to the normal operation mode in a relatively short period of time and without falsely determining that the system voltage conditions are stable. On the basis of the results of this consideration, a standard terminal voltage that is assumed as the optimum is preferably determined for each of the capacitive and inductive power factors.

In addition, on this occasion, when the power factor is capacitive, since control is performed such that the reactive power is continuously supplied from the generator 5 after the mode is switched to the normal operation mode, the system voltage can be stabilized in the normal operation mode even if the mode is switched somewhat earlier. Therefore, the standard terminal voltage can be set to a relatively small value, for example, a value around 0.85.

On the other hand, when the power factor is inductive, since control is performed such that the reactive power is absorbed from the power system 13 after the mode is switched to the normal operation mode, the instability of the power system 13 is accelerated if the mode is falsely switched earlier.

Thus, when the power factor is inductive, it is preferable to set the standard terminal voltage to around 1.0 for focusing on safety.

As described above, in the wind turbine generator system according to this Embodiment, since the conditions for switching from the low-voltage control mode to the normal operation mode are determined according to the state of the power factor, the switching to the normal operation mode can be performed at a suitable timing.

The invention claimed is:

1. A wind turbine generator system comprising:
a generator connected to a power system; and
a control unit having a normal operation mode and a low-voltage control mode, the control unit
controlling reactive current depending on a terminal voltage of the generator,
switching from the normal operation mode to the low-voltage control mode when a system voltage of the power system is decreased to a value lower than a predetermined value, and
switching from the low-voltage control mode to the normal operation mode when the system voltage of the power system is increased to a value higher than a standard terminal voltage,
wherein the control unit
detects a power factor of the generator when the normal operation mode is switched to the low-voltage control mode, and
sets the standard terminal voltage for switching from the low-voltage control mode to the normal operation mode, and
the standard terminal voltage is set depending on the detected power factor.

2. The wind turbine generator system according to claim 1, wherein
in the case where the power factor of the generator is inductive when the normal operation mode is switched to the low-voltage control mode, the control unit sets the standard terminal voltage to a previously registered first value, and
in the case where the power factor of the generator is capacitive, the control unit sets the standard terminal voltage to a second value that is lower than the first value.

3. The wind turbine generator system according to claim 2, wherein the first value and the second value are determined based on the result of simulation performed in advance.

* * * * *